United States Patent [19]
Covert et al.

[11] Patent Number: 5,982,995
[45] Date of Patent: Nov. 9, 1999

[54] METHOD FOR LOGGING DATA IN AN ELECTROPHOTOGRAPHIC PRINTING MACHINE

[75] Inventors: David W. Covert, Ontario; Jose A. Pena, Rochester, both of N.Y.

[73] Assignee: Xerox Corporation, Stamford, Conn.

[21] Appl. No.: 08/743,256

[22] Filed: Nov. 4, 1996

[51] Int. Cl.[6] ................................................ G06F 13/00
[52] U.S. Cl. .................. 395/114; 395/112; 395/113; 395/200.58; 710/8; 710/15; 707/517; 707/908; 707/505; 707/522
[58] Field of Search ...................... 395/112–114, 200.58; 710/8, 15; 707/517, 908, 505, 522

[56] References Cited

U.S. PATENT DOCUMENTS

| | | | |
|---|---|---|---|
| 5,223,853 | 6/1993 | Wysocki et al. | 346/1.1 |
| 5,541,840 | 7/1996 | Gurne et al. | 364/424.03 |
| 5,696,899 | 12/1997 | Kalwitz | 395/200.1 |

*Primary Examiner*—Mark R. Powell
*Assistant Examiner*—Lance W. Sealey
*Attorney, Agent, or Firm*—J. E. Beck; H. Fleischer

[57] ABSTRACT

A method of recording events in a printing machine having a plurality of subsystems. The recorded event corresponds to selected information generated as a result of an event occurring at one of the plurality of subsystems. The log event is communicated to a logging service. A log event file is created from the event information received at the logging service. The log event file is arranged in a file arrangement having a log event record. The log event file is translated to place the log event file in a readable output form.

4 Claims, 5 Drawing Sheets

METHOD FOR LOGGING DATA IN AN ELECTROPHOTOGRAPHIC PRINTING MACHINE

The present invention relates generally to an electrophotographic printing machine, and more particularly relates to a method which permits a centralized logging service to gather and maintain information for multiply distributed machine modules.

In the well-known process of electrophotographic printing, a charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern known as a latent image. The latent image is developed by contacting it with a dry or liquid developer material having a carrier and toner. The toner is attracted to the image areas and held thereon by the electrostatic charge on the photoreceptor surface. Thus, a toner image is produced in conformity with a light image of the original being reproduced. The toner image is transferred to a copy sheet, and the image affixed thereto to form a permanent record of the image to be reproduced. Subsequent to development, excess toner left on the photoreceptor is cleaned from its surface. The process is useful for light lens copying from an original document or for printing electronically generated or stored originals such as with a raster output scanner (ROS), where a charged surface may be imagewise discharged in a variety of ways.

The foregoing discussion generally describes a typical black and white or single color electrophotographic printing process. The approach utilized for multicolor electrophotographic printing is substantially identical. However, instead of forming a single latent image on the photoreceptor, multiple latent images corresponding to different color separations are sequentially recorded on the photoreceptor. Each single color latent image is developed with a complimentary toner. The process is repeated for each of the differently colored images. Thereafter, each single color toner image is transferred to the copy sheet in superimposed registration with the prior toner image, creating a multi-layered toner image. The multi-layered toner image is permanently affixed to the copy sheet in a conventional manner to form a finished color document. Alternatively, the multi-layered toner can be formed on the photoreceptor and transferred in a single pass to the sheet forming the finished print.

As electrophotographic printing machines such as copiers and printers become more complex and versatile in the jobs that they perform, the servicing and monitoring of these machines become more complex. Modern printing machines include modules having software procedures that control the functions of scanning, printing, and finishing. Any erroneous operation or failures affecting the performance of these functions support the need for a logging service that monitors the operation of the machine's software. When failures are detected, the logging system provides an engineer or service representative with information and messages that lead to service diagnosis, engineering problem solving, and other investigative processes.

Pursuant to the features of the present invention, there is provided a method of recording events in a printing machine having a plurality of subsystems. Each recorded event corresponds to selected information generated by an event occurring at one of the plurality of subsystems. The event information is communicated to a logging service. A log event file is created from the event information received at the logging service. The log event file is arranged in a file arrangement having a log event record. The log event file is translated into a readable output form.

Other aspects of the present invention will become apparent as the following description proceeds and upon reference to the drawings, in which.

Figure 1:
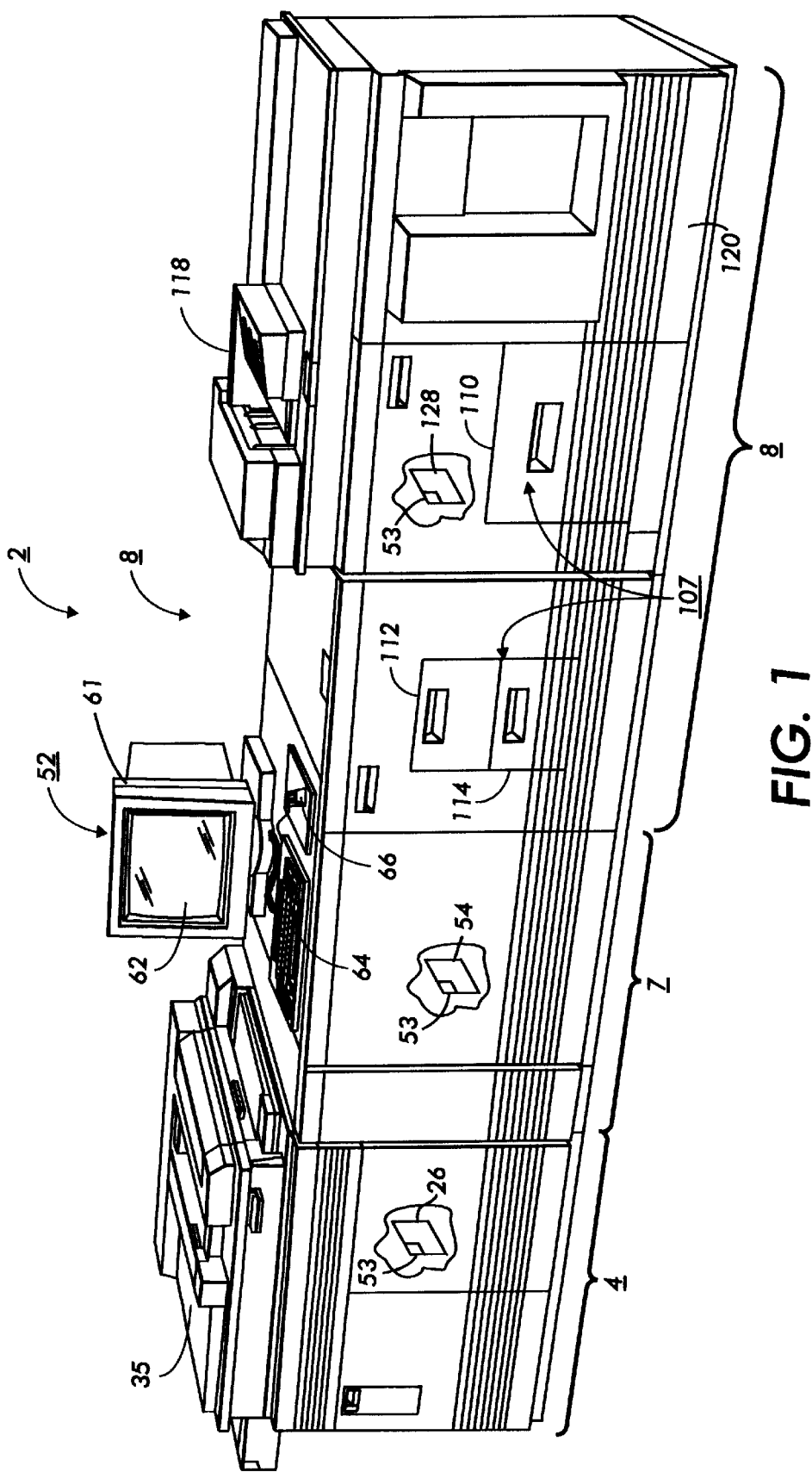
FIG. 1 is a perspective view of an illustrative printing machine incorporating the central logging service of the present invention therein.

While the present invention will hereinafter be described in connection with a preferred embodiment thereof, it will be understood that it is not intended to limit the invention to that embodiment. On the contrary, it is intended to cover all alternatives, modifications, and equivalents that may be included within the spirit and scope of the invention as defined by the appended claims.

For a general understanding of the features of the present invention, reference is made to the drawings. In the drawings, like reference numerals have been used throughout to designate identical elements. It will become evident that the logging system of the present invention is equally well suited for use in a wide variety of printing systems and is not limited to the particular embodiment depicted herein.

Referring initially to FIG. 1, there is shown an illustrative printing machine 2 incorporating the central logging service of the present invention therein. Printing system 2 includes an image input module 4, a controller module 7, and a printer module 8. Input module 4 is a raster input scanner (RIS) that creates an electronic image of an original document by scanning one scan line at a time until the whole document has been scanned into printing system 2. The image data contained in the original documents consists of analog signal levels for every picture element (pixel). White is at one level, black is at another, and gray is an appropriate level therebetween. The analog levels are converted to digital image data by the input module 4 and sent to controller module 7 in a serial stream of binary digits (bits). Controller module 7 is a computer that is connected between image input module 4 and printer module 8. The purpose of controller 7 is to process software that manipulates data. The software in Controller 7 serves to control the operation of printing system 2 and to control and process the imaging of digital data. Controller 7 includes a user interface (UI) 52 having a cathode ray tube (CRT) display 61, an interactive touch screen 62, a keyboard 64 and a mouse 66. The printer module 8 receives the digital imaging data from the controller module 7 and reformats it into two serial imaging data channels leading to a ROS. The ROS (not shown) produces a latent image on a charged photoreceptor (not shown) by discharging non-image areas thereon with a laser beam. The latent image is developed by contacting it with a dry developer material having a carrier and toner. The toner is attracted to the image areas and held thereon by the electrostatic charge on the photoreceptor surface. The toned image is transferred to a copy sheet and affixed thereto before undergoing further finishing operations that will be discussed hereinafter with reference to FIG. 2. Those skilled in the art will recognize that other print engines are suitable for use in printer module 8. Printer module 8 may employ an ink jet, ionographic, thermal, or photographic printer. The control signals for printing system 2 are generated and distributed by a plurality of printed wiring boards (PWBs) in a multiprocessor architecture characterized by microprocessor controllers 26, 54, and 128 located in the image input module, the controller module, and the printer module respectively. These microprocessor controllers are serially interconnected, and serially linked to numerous input and output processing PWBs (not shown). Each controller 26, 54, and 128 has a logging service 53. Logs are maintained locally by the logging services 53 on controller 26 and 128. The local logs are uploaded to a central logging service 53 located on controller 54.

Figure 2:
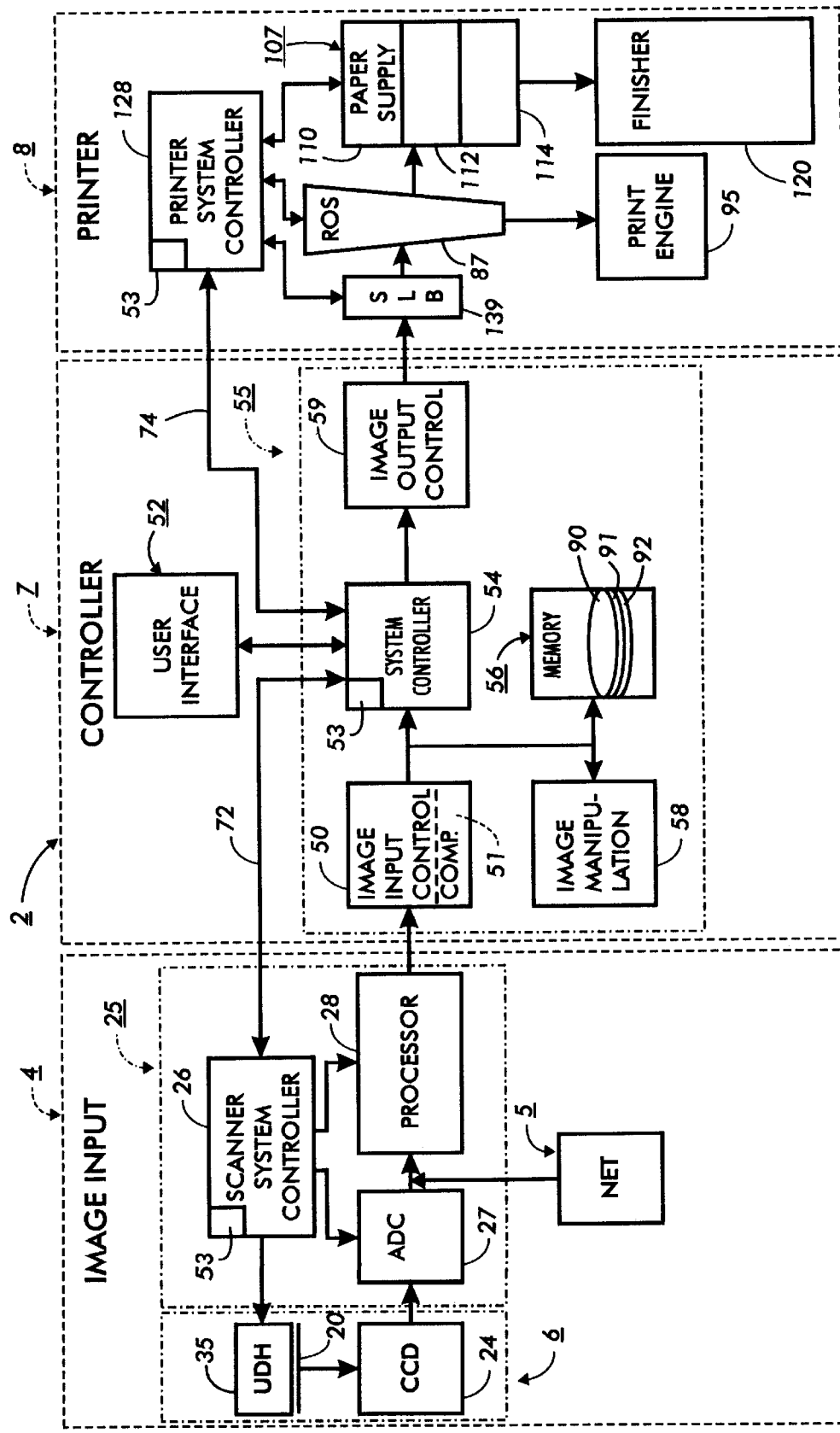
FIG. 2 is a schematic diagram showing the major elements of the FIG. 1 printing machine.

FIG. 2 schematically shows the major internal components for each of the modules discussed in FIG. 1. The image input module 4 has a document scanner 6 and an image processor 25. The document scanner 6 includes a Universal Document Handler (UDH) 35 that sequentially places multiple sets of original documents on a transparent platen 20. One or more linear light sensitive arrays 24, such as Charge-Coupled Devices (CCDs) located under platen 20 scan each document. Subsequently, analog signals pass from array 24 to the image processor 25. An analog-to-digital converter (ADC) 27 transforms the analog signals to digital data. Digital image information also enters image processor 25 by way of a connector 5. Connector 5 provides a communication channel to a local area network (LAN) such as Ether-Net®. Other remote sources such as streaming tape, floppy disk, and video input are also useable. A processor 28 performs enhancement operations on the original document image to make it suitable for printing. These operations include filtering, threshold treatment, screening, cropping, and scaling (reduction or enlargement). A scanner system controller 26 controls the functions of image input module 4 and contains electronic circuitry for the image module logging service 53.

The controller 7 module includes an Electronic Subsystem (ESS) 55 and User Interface (UI) 52. UI 52 allows an operator to interact with printing system 2. With UI 52, the operator submits print requests and other instructions to ESS 55. Conversely, the operator obtains system operating, programming, and diagnostic information, or visual document displays from UI 52, by way of the ESS 55. The ESS 55 comprises units 50, 51, 54, 56, 58, and 59. An image input control 50 compresses scanned image data at a compression processor 51. The compressed data enters one of a plurality of image files representing different print jobs. The image files reside in a secondary memory (not shown) awaiting transfer to main memory 56 when prompted by system controller 54. The main memory 56 consists of rigid magnetic disks 90, 91, and 92. The high recording density of the disks stores machine data, the Operating System, and processed image data. An image manipulator 58 collates, edits, decomposes, and rotates the scanned image when required. Image output controller 59 transfers the scanned image to printer module 8 for printing. System controller 54 controls the functions performed by controller 7. It is also the master controller for the entire printing system 2. Signal pathways 72 and 74 make scanner system controller 26 and printer system controller 128 responsive to controller 54 in a master-slave environment. The printer system controller 123 contains the electronic circuitry for the logging service 53 residing in the controller 7 module.

Printer module 8 is a laser type printer. It comprises a Raster Output Scanner (ROS) 87, Scan Line Buffer (SLB) 139, Print Engine 95, Paper Supply 107, Finisher 120, and Printer System Controller 128. The Scan Line Buffer 139 receives compressed image data from controller 54 and presents it to ROS 87. The ROS 87 has a dual beam laser with each beam modulated by an opto-acoustic modulator according to the content of the image received from SLB 139. A rotating polygon, in ROS 87, generates imaging beams that scan a moving photoreceptor in Print Engine 95. It exposes the photoreceptor and creates a latent image thereon in response to the image signal at the ROS input. Print Engine 95 develops the latent image and transfers it to print media delivered by paper supply 107. The print media consists of various substrates that are capable of accepting an image. Such substrates include transparencies, preprinted sheets, vellum, glossy covered stock, and film. These substrates comprise a variety of sheet sizes, and colors. Media supply trays 110, 112, 114, provide storage for the different substrates types. The transferred image is fused to the substrate and the resulting prints are discharged at an output tray (not shown), or to a finisher 120. Finisher 120 performs certain finishing selections that create a final document. The finisher stitches, staples, or thermally binds prints together to form books. Other finisher options include slitting, perforating, saddle stitching, folding, and trimming. The printer system controller 128 controls the printer functions and operation according to job instructions programmed by way of the UI 52. The Printer System Controller 128 also contains the electronic circuitry for the logging service 53 at Printer module 8.

Figure 3:
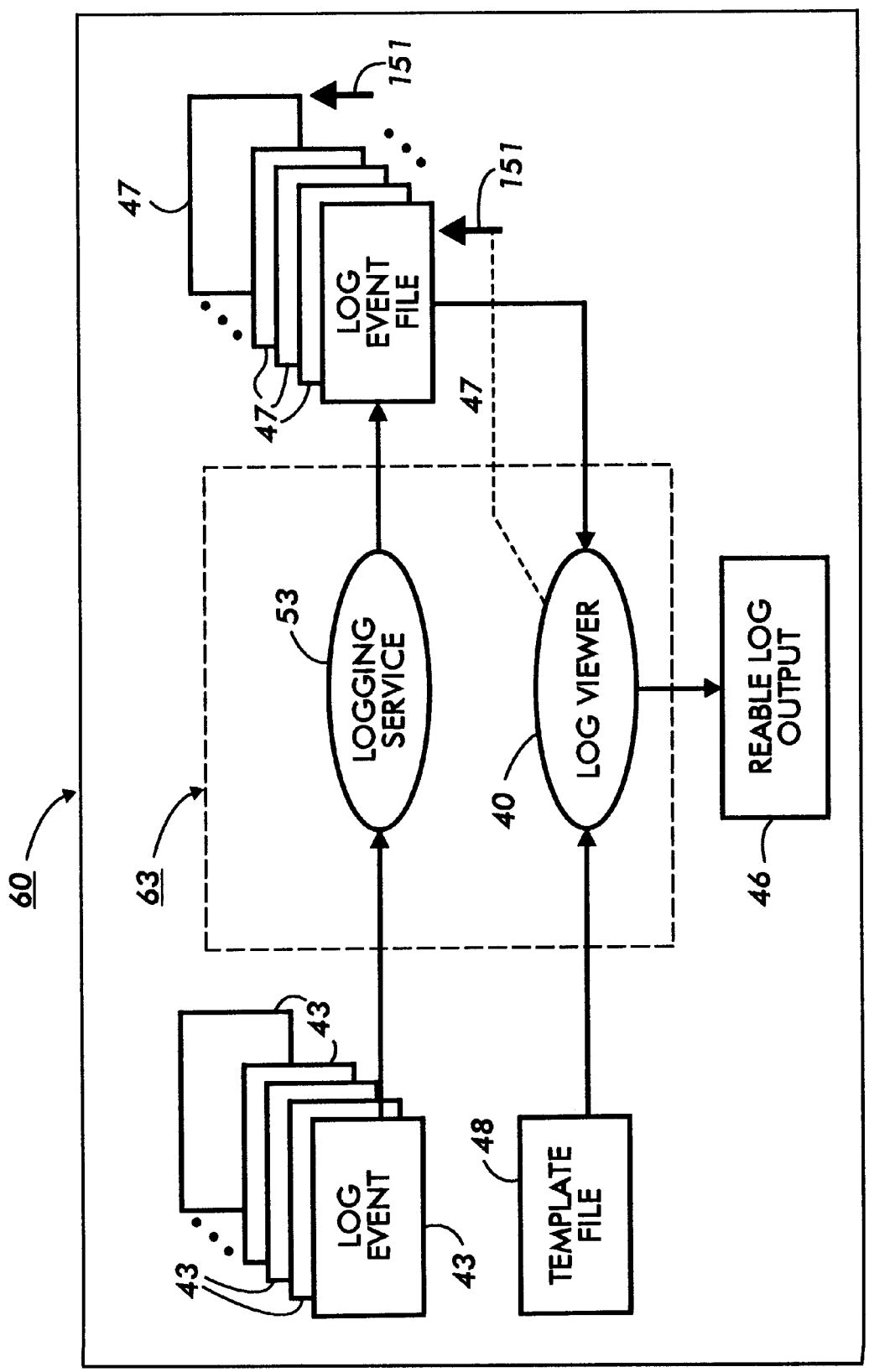
FIG. 3 is a schematic view illustrating various components and information flow of a logging system embodying the present invention.

FIG. 3 schematically illustrates various components and information flow of a logging system 60 embodying the present invention. The logging system 60 contains a symbolic disassembler 63 for translating reports generated in a machine level language (i.e., 1's and 0's) to a readable high-level language. The symbolic disassembler 63 includes logging service 53 and a log viewer 40. Logging service 53 receives information about log events 43 and records the information in log event files 47. The logged data structures are described in a template file 48. Log viewer 40 receives the log event files 47 along with the template file 48 to form a readable log output 46. The log viewer 40 parses the log events files 47 to reconstruct data comprising the logged event 43. The readable output is then constructed according to the structures found in the template 48. Log viewer 40 has a pointer 151 which will be discussed hereinafter with reference to FIG. 5. The machine modules of FIGS. 1 and 2 initialize and lock out writing of log files 47 during data collection. Automatic collection occurs every time the printing machine shuts down after a problem occurs. During automatic collection, logging service 53 retains the log event files 47 for the last 16 shut down events. Storage for these logs resides on one of the memory disks 90, 91, or 92 shown in FIG. 1. File collection also occurs when a user observes a machine problem and manually invokes the collection. In manual collection, logging service 53 retains the log event files 47 for the last 16 invocations on another one of the memory disks 90, 91, or 92. Separate memory storage locations prevent the automatic logs from over writing the user invoked logs. An end user such as an engineer or service technician uses logging system 60 to assemble and organize information from as many log event files 47 as are requested by template 48 The template 48 is a separate object file, that is the output of a development system used for the writing software programs. Template 48 is written in a common, high-level programming language and loaded into logging system 60 from a diskette, or by way of a remote communications channel. The template is made up of strings and symbols. One skilled in the art will recognize that a string is a series of alphanumeric characters. The string can be one character or it can be pages of characters. The template further provides certain conventions that set the spelling and capitalization of key concepts. The capitalized word "ERROR" for example, occurs when logging system 60 detects a machine problem. Thus, template 48 provides the engineer or service technician with standard descriptions that track particular events through the log. Since template 48 is created on a development system that is extraneous to the symbolic disassembler 63, it can be modified by adding or removing entries. This has the effect of creating a log output with only a subset of events 43 being parsed. The engineer, or service technician can insert different sets of templates 48 that parse different or larger sets of log events 43 without forcing the symbolic disassemble 63 to change.

Logging service 53 is not required to be in a specific machine module. An active service may be any one of the logging services 53 located at the image input module 4, the printer module 8, or the controller module 7 shown in FIG. 2. There may be one active logging service 53 or there may be several logging services 53 in use. For the latter, each logging service 53 may handle a single log event 43 or a collection of log event streams. The types of information that comprise a log event 43 include: normal, and abnormal service operational status and statistics, performance-analysis data, debugging information, and execution trace and code profiling data. Additional items that constitute the log event 43 are major input and output messages for respective machine modules, machine module instructions to propose, accept, confirm or break processing, and module work disposition. Log events that are specifically logged at controller module 7 consist of job queue summaries. With regard to debugging information, the machine modules log all events 43 that aid in detecting, locating and correcting software errors occurring in the modules. Since each logging service 53 is local its machine module, their operation consumes little of the printing machine's real-time operation.

Figure 4:
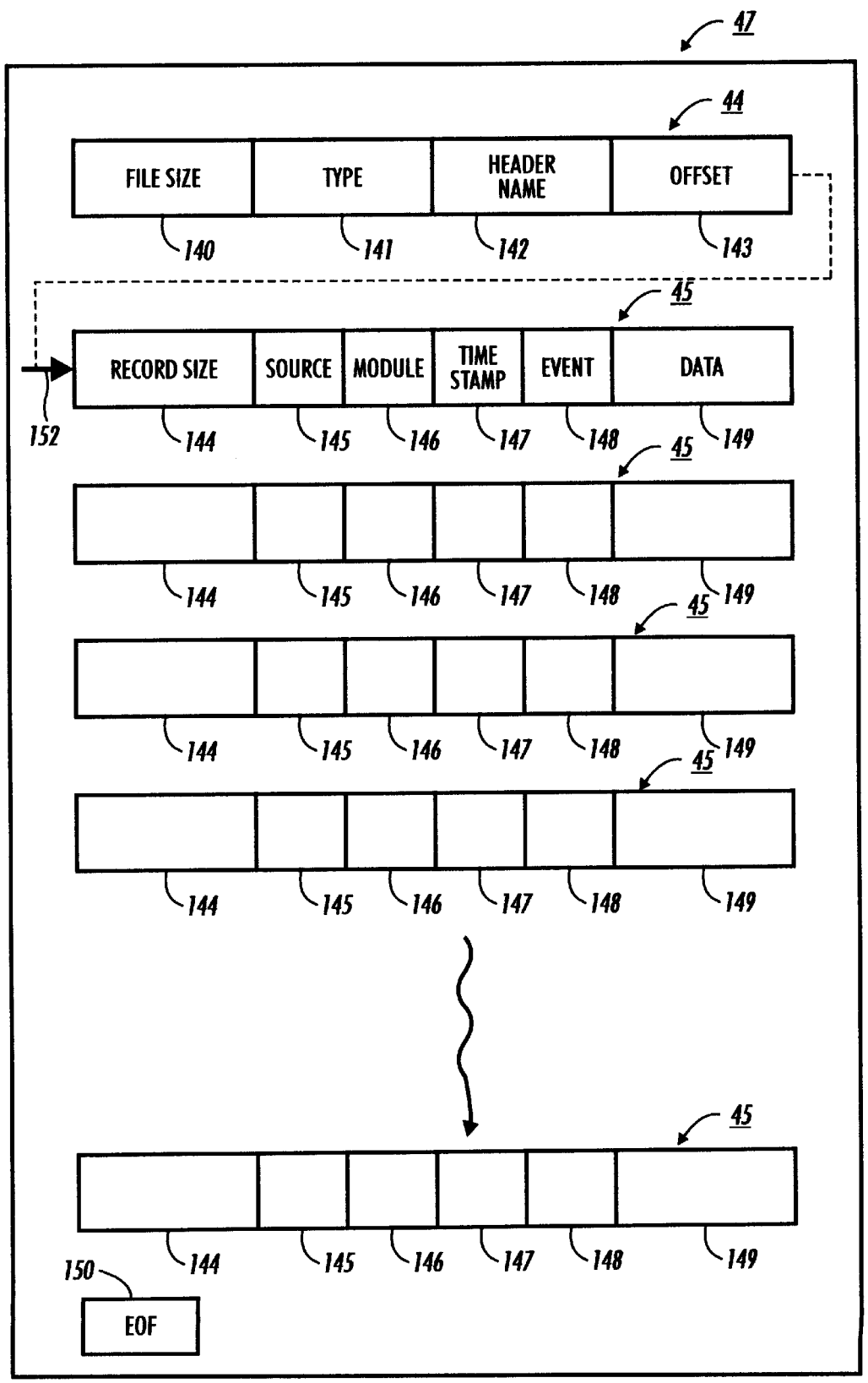
FIG. 4 is a diagrammatic representation of a log event file.

FIG. 4 shows the organization of records contained in the log event file 47. Each event file 47 has a header 44, a plurality of event entries 45, and an end-of-file (EOF) bit 150. When bit 150 is equal to 1, the EOF is said to be TRUE. When bit 150 is 0, EOF is FALSE. The information in header 44 includes: a size 140 indicative of the number of bytes in file 47, a log type 141, a header name 142 and an offset 143. Offset 143 is a pointer 152 that points to the memory location of the first event entry 45. Log type 141 identifies a recirculating or non-recirculating type file. The recirculating type sequentially overwrites the oldest entry with new data. When the file type is recirculating, the value of offset 143 value is zero. Recirculating-type random access memory (RAM) buffers are used for recirculating files. When the recirculating files are to be viewed, they are collected and written to a permanent memory media such as one of disks 90, 91, or 92 in FIG. 2. Each log entry 45 has a plurality of field including: a record size 144, a source identification 145, a module identification 146, a time stamp 147, an event field 148, and a data field 149. In a system having a synchronized clock, time stamp 147 allows the logging service to merge log events from other logging services to create a time ordered list of log events. The module identification field 146 classifies the appropriate module with an exemplary word like: "Imager", "Control-ler" or "Printer". Likewise, the source identification field 145 names the central processing unit (CPU) associated with the module such as the scanner system controller 26, system controller 54, or the printer system controller shown in FIG. 2. The event field 148 contains a short descriptor similar to "jam", "adjustment", "feed", or "delivery" to classify the event. The data field 149 further includes the number of times that an event occurred and a description of the event. Since all information contained in log event file 47 is recorded with a low-level language of 1's and 0's, a status of sheet 123 may be translated at data field 149 by the header template 48 (FIG. 3) as:

Sheet 123 was fed from tray 1 at 10:46:32:90; and
Sheet 123 arrived at Sensor 10 early by 4 ms.

Figure 5:
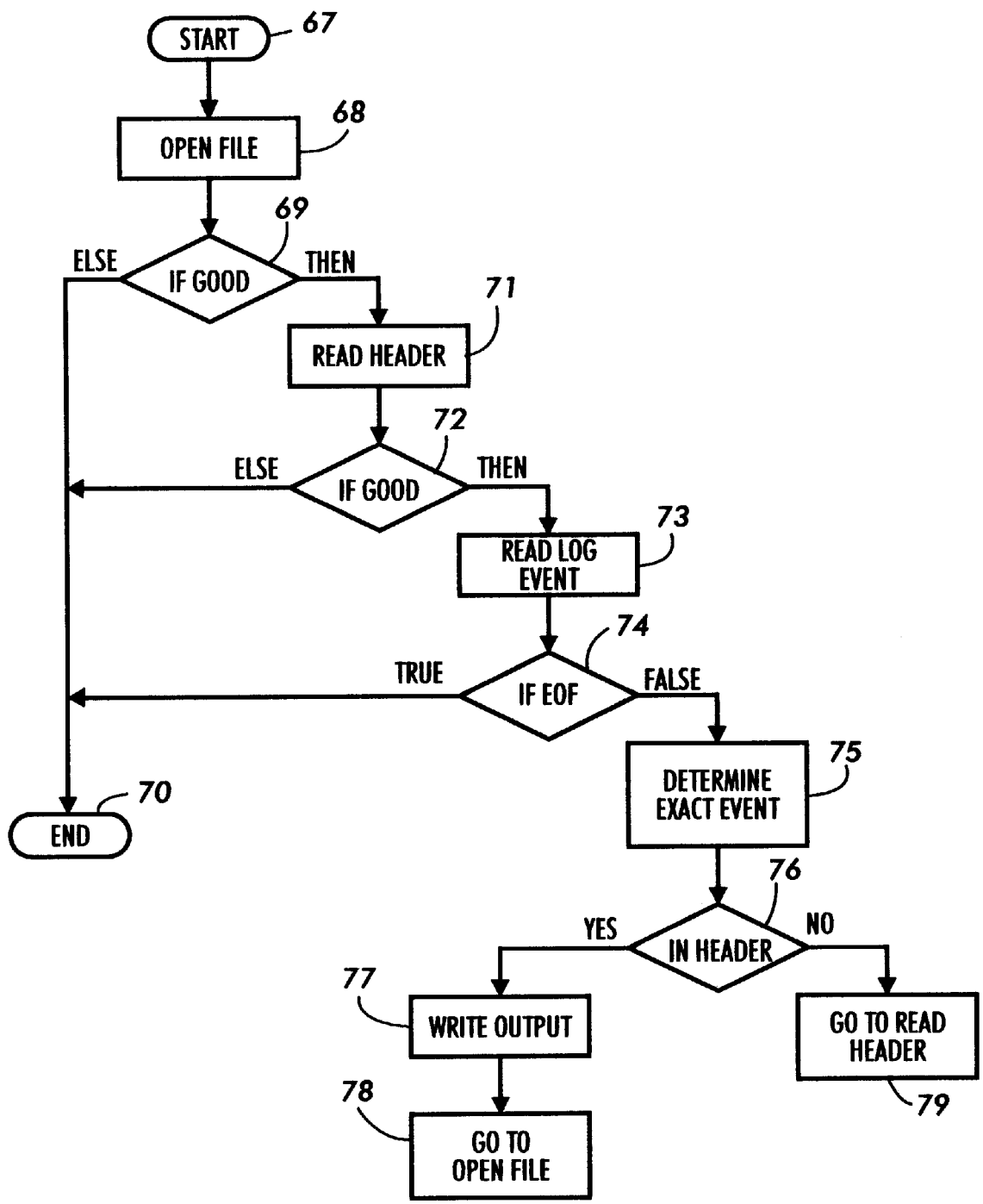
FIG. 5 is a flow diagram showing the operation of a log viewer.

FIG. 5 is a flow chart illustrating how log viewer 40 (FIG. 3) reconstructs the structure of a logged event. The procedure begins at step 67. A log event file is opened at step 68. The particular event file opened is the one currently pointed to by pointer 151 in FIG. 3. Step 69 is a test to determine the validity of the opened file. If the logged event file is good, the IF branches to the "THEN" portion and reads the header, at step 71. If the header is bad, the IF branches to an END statement 70 by way of the "ELSE" portion. An IF statement, at step 72, tests the validity of header. If the header is good, IF statement 72 branches to its "THEN" portion and reads the log event entry, at step 73. If the header is bad, IF statement 72 branches to END statement 70 by way of its "ELSE" portion. At step 74, another IF statement checks for the EOF. If EOF is "TRUE", the procedure halts at END statement 70. If EOF is "FALSE", IF statement 74 branches to step 75 and determines the exact event to be reported with the higher-level language based strings and symbols found in the template file. Step 76 verifies that the event is named at field 142, in header 44 (FIG. 4). If "NO" (i.e., there is an event in the header, but not in the log), then step 79 loops back to read the header at step 71. IF "YES" (i.e., the event is named in the header and contained in the log), then an output report is written, at step 77. The output may be displayed on the UI 52 shown in FIGS. 1 and 2, stored on a diskette, or sent to a remote device via a communications channel. After the output is written, step 78 loops back to step 68 and opens another file pointed to by pointer 151 in FIG. 3.

It is, therefore, evident that there has been provided, a central logging service according to the present invention, that fully satisfies the aims and advantages of the invention as hereinabove set forth. While the invention has been described in conjunction with a preferred embodiment thereof, it is evident that many alternatives, modifications, and variations may be apparent to those skilled in the art. Accordingly, it is intended to embrace all such alternatives, modifications, and variations which may fall within the spirit and broad scope of the appended claims.

We claim:

1. A method of recording events in a printing machine having a plurality of subsystems, each recorded event corresponding to selected information generated by an event occurring at one of the plurality of the subsystems and event information being communicated to a logging service, including:

creating a log event file from event information received at the logging service;

arranging the log event in a file arrangement having a log event recorded;

translating each log event file into a readable output form;

selecting from a plurality of templates a template; and displaying, in response to a user request, the readable output in the selected template.

2. A method according to claim 1, wherein displaying the readable output includes placing each log event in readable output form with a log viewing control application.

3. A method according to claim 2 wherein displaying the readable output includes configuring the log viewing control application for the selected template.

4. A method according to claim 3, wherein configuring the log viewing application includes providing the template file with strings and symbols.

\* \* \* \* \*